United States Patent
Coroy et al.

(10) Patent No.: US 9,613,546 B2
(45) Date of Patent: Apr. 4, 2017

(54) SYSTEMS AND METHODS FOR MANAGING AND PRESENTING GEOLOCATION DATA

(71) Applicant: Trenton Gary Coroy, Steinbach (CA)

(72) Inventors: Trenton Gary Coroy, Steinbach (CA); Timothy Roy Koop, Ste. Anne (CA)

(*) Notice: Subject to any disclaimer, the term of this patent is extended or adjusted under 35 U.S.C. 154(b) by 96 days.

(21) Appl. No.: 14/093,824

(22) Filed: Dec. 2, 2013

(65) Prior Publication Data

US 2014/0157139 A1    Jun. 5, 2014

Related U.S. Application Data

(60) Provisional application No. 61/732,634, filed on Dec. 3, 2012.

(51) Int. Cl.
| G06F 3/00 | (2006.01) |
| G09B 29/00 | (2006.01) |
| G01C 21/36 | (2006.01) |

(52) U.S. Cl.
CPC ....... G09B 29/007 (2013.01); G01C 21/3682 (2013.01)

(58) Field of Classification Search
CPC ......... G06F 17/30884; G06F 17/30867; G06F 3/0481; G06F 2203/04804; G06F 3/04817; H04L 41/12
See application file for complete search history.

(56) References Cited

U.S. PATENT DOCUMENTS

| 6,587,787 | B1* | 7/2003 | Yokota ........................... 701/532 |
| 7,797,642 | B1* | 9/2010 | Karam et al. ................. 715/810 |
| 2009/0100363 | A1* | 4/2009 | Pegg et al. .................... 715/765 |
| 2011/0106592 | A1* | 5/2011 | Stehle et al. ................. 705/14.1 |
| 2011/0161829 | A1* | 6/2011 | Kristensen ..................... 715/739 |
| 2013/0141460 | A1* | 6/2013 | Kane-Esrig .......... H04M 3/5116 345/633 |

* cited by examiner

*Primary Examiner* — Anil N Kumar
(74) *Attorney, Agent, or Firm* — Bereskin & Parr LLP (57) ABSTRACT

A system for managing and presenting geolocation data. The system includes a plurality of electronic devices and a server in data communication with a plurality of electronic devices. The server has a processor that is configured to receive requests from an electronic device for a map including a feature of interest and the feature having associated location information therewith. The location information is indicative of a geographic location of the feature and comprises information indicative of a precision of the geographic location. The processor provides a precise icon and an imprecise icon for representing a feature on a map, each having a constant size. The processor is also configured to determine whether to use the precise icon or the imprecise icon to represent the feature on the map based upon information indicative of a scale of the map and the precision of the location information associated with the feature. The processor generates the map including the feature being represented by the precise icon or the imprecise icon.

20 Claims, 8 Drawing Sheets

SYSTEMS AND METHODS FOR MANAGING AND PRESENTING GEOLOCATION DATA

RELATED APPLICATIONS

This application claims priority to U.S. Provisional Patent Application No. 61/732,634, filed on Dec. 3, 2012 and entitled "SYSTEMS AND METHODS FOR MANAGING AND PRESENTING LOCATION DATA".

TECHNICAL FIELD

The embodiments herein relate to data management systems, and in particular to systems and methods for managing and presenting geolocation data.

INTRODUCTION

Geolocation data generally refers to data indicative of a geographical location. The geolocation data may be associated with a feature of interest at a particular location on a map such as a person, a place, a building, a point of interest or any other feature of interest. The geolocation data may include, for example, information such as geocodes, street address, city, postal or zip codes, and other general information about the feature.

Many applications use geolocation data to show the location of one or more features on a map. For example, Global Positioning Devices may use geolocation data to guide a user to a destination. As another example, online mapping tools may use geolocation data to indicate the locations of various features of interest on a map.

In addition, one or more electronic social networks may use geolocation data to indicate the location of their users or participants. For example, participants may be "plotted" or indicated on a map relating to a geographical area. This allows a user to observe at a glance where the members of his or her social network are located.

While providing geolocation information is generally desirable, some users may have security, privacy and/or other concerns about having their location information broadcast. Furthermore, various users may wish to provide their geolocation information at different granularities, for example, due to various security settings. It may be challenging for applications to present geolocation data with varying precision on a single map of a given scale while conveying the precisions of the location data that is being presented on the map.

BRIEF DESCRIPTION OF THE DRAWINGS

Various embodiments will now be described, by way of example only, with reference to the following drawings, in which.

DETAILED DESCRIPTION

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

Each program may be implemented in a high level procedural or object oriented programming and/or scripting language to communicate with a computer system. However, the programs can be implemented in assembly or machine language, if desired. In any case, the language may be a compiled or interpreted language.

The systems and methods as described herein may also be implemented as a non-transitory computer-readable storage medium configured with a computer program, wherein the storage medium so configured causes a computer to operate in a specific and predefined manner to perform at least some of the functions as described herein.

It should be understood that the various aspects of various embodiments described herein may be applicable to any application that manages and presents geolocation data, and not limited to the context of an electronic social network. Such applications may include, but are not limited to, applications such as GPS applications and mapping applications that manage and present geolocation data.

As noted above, geolocation data generally refers to data indicative of a geographical location of an associated feature of interest. Geolocation data may be provided in various formats. For example, geolocation data may include latitude and longitude information, geocodes, textual information such as street address, city, postal or zip codes and so on. In some cases, geolocation data may include additional information about the feature of interest. For example, if the geolocation data is for a city, the geolocation data may include the size of the city, population density, and so on.

Furthermore, geolocation data may have different precisions, and may be categorized as having various levels of precision. For example, geolocation data about a first location may include a detailed street address and/or a postal code/zip code, and the first location might therefore be considered precise to a street-level. In contrast, geolocation data about a second location may only include city information, and the second location might therefore only be considered precise to a city-level.

In some cases, geolocation data precision-level may be limited by availability of information. For example, some users in a social network may not wish to provide any location information to an electronic social network, or only provide general location information (e.g. neighbourhood-level, city-level, or country-level). This may be due to privacy and/or security concerns.

In some cases, precision of available geolocation data may be limited based upon the identity of the requester. For example, a user may configure his security/privacy settings such that higher precision geolocation data is provided to selected family and close friends, while lower precision geolocation data is provided to others. For example, a user may choose to share street-level location information with some users and/or in some contexts, and to share only country-level location information with some other users and/or in some other contexts.

In some cases, the geolocation data may be derived from some other information and the precision of such derived geolocation data may be limited to city-level, province/state-level, and/or country-level precision. For example, it may be possible to derive location information from an Internet Protocol address ("IP Address"). However, the precision of the location information may be limited to province/state-level or country-level precision. In another example, it may be possible to derive location information from various communication networks that a user's electronic device is connected to. For example, if the user is using a smart phone, it may be possible to determine an approximate location of the user based upon the phone network that the user is connected to. In another example, if the user is using a device that is connected to a wireless data network such as a Wi-Fi network, it may be possible to determine an approximate location of the user based upon the identity of the network or networks that it is connected to.

Generally, maps of different scales are provided by various mapping tools. In some cases, the scale of the map may be provided on the map itself. In some cases, the scale of the map may be hidden. The scale of the map that is presented electronically may also be referred to colloquially as a "zoom-level" of the map. That is, the user may "zoom-in" on an area of interest on the map to obtain additional details on that area. In some cases, a second map of a different scale including the additional details may be provided.

For example, the scale or zoom level of the map may be set such that the entire world is visible on the map. The user may "zoom in" on a particular country to view various provinces/states in that country. The user may then zoom in again to obtain a map of a city in a particular province/state in the country. The user may then zoom out to return to a country-level map or a state/province-level map.

In some cases, low zoom levels may indicate larger scales on the map, and high zoom levels may indicate smaller scales. For example, zoom level "0" may indicate a map with a scale of one thousand kilometers per centimeter, while zoom level "1" may indicate a map with a scale of 500 kilometers per centimeter, zoom level "2", a map with a scale of 250 kilometers per centimeter, and so on. In some cases, the values may be reversed such that higher zoom levels indicate larger scales and lower zoom levels indicate smaller scales.

In some cases, a provided map may not be drawn to scale. Nevertheless, it may be possible to reveal more or less details for an area of interest by selecting an appropriate zoom-level.

The zoom-level of a displayed map may be selected by the system or by a user. For example, when a user requests location data, the system may display a map at a default zoom-level. The user may then interact with the map to obtain the desired zoom-level for the map.

One challenge is to present location data of varying precision-levels on a single map of a given zoom-level. That is, geolocation data that have different precision-levels associated with a number of features may be presented on a single map. For example, a user may wish to view at a glance where his or her friends, who are in his electronic social network, are located on a map. In that scenario, some of the friends may have associated geolocation data with street-level precision, while others may have data with city-level precision, province-level precision, and so on. In such cases, it may be difficult to convey information about the precision-levels of each feature.

To further illustrate the problem, assume that it is necessary to represent two features, one being a person who lives in the United States (country-level precision), and the other feature being a person who lives in the city of Washington D.C. (city-level precision). To represent the person in the United States, an icon may be placed in the geological centre of continental United States. However, as the geological centre of the United States lies near Nebraska, Colorado and/or Kansas State, a person viewing the icon may think that it indicates a person living in one of the above states. Similarly, the icon representing the city-level precision location data may be mistaken as indicating street-level precision.

In some cases, some mapping tools use icons of varying size to indicate precision of the location information being represented by the icon. For example, the icon may include a large circle covering the entire city of Washington D.C. to highlight that the icon is representative of the city of Washington D.C. and not a street area. Similarly, location services applications in some smart phones are able to approximate the location of the phone based upon location of the cellular towers in communication with the phone. In such cases, the mapping software may use a large "imprecision" circle to indicate generally where the phone is located. While this type of indication may be useful to indicate one or several imprecise locations, it may become messy and difficult to understand if there are more than a few locations to indicate due to crowdedness and various overlaps between circles associated with various users.

Figure 1:
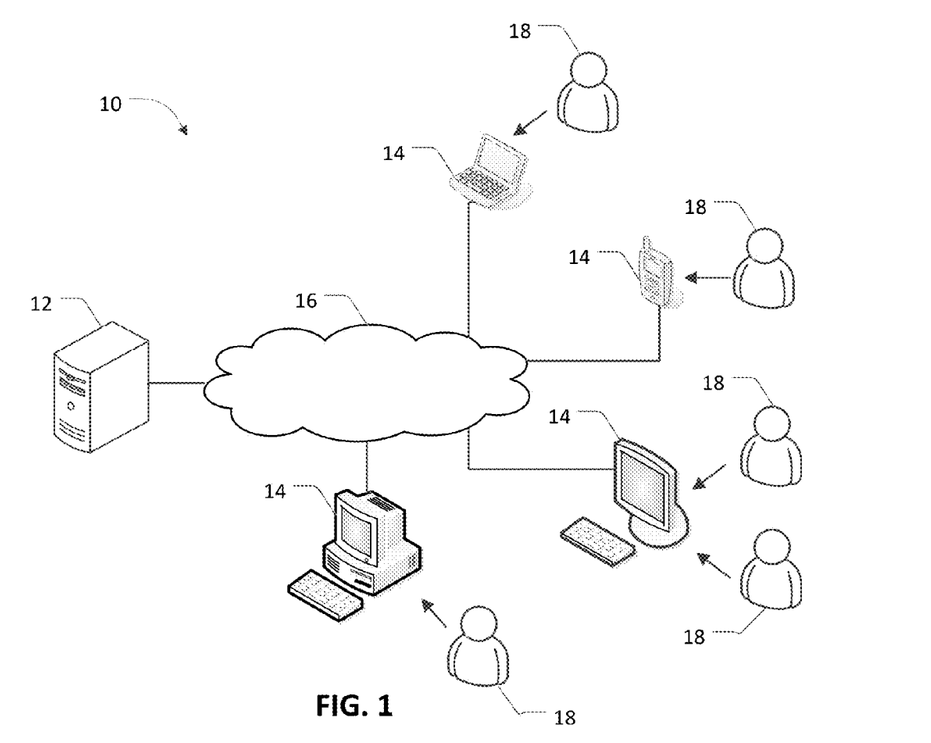
FIG. 1 is a schematic diagram of a system for managing and presenting geographical data according to some embodiments.

Referring now to FIG. 1, illustrated therein is geolocation data management system 10 according to some embodiments. The system 10 comprises a server 12 configured to manage and provide location data. The server 12 is accessible through a network 16 by various users 18 using various electronic devices 14.

The server 12 may be a web server that provides web pages to the electronic devices 14 over the Internet. The electronic devices 14 may interface with the server 12 using various web browsing applications or applications that are dedicated to accessing the server 12. In some cases, the server 12 may include a plurality of physical computers located in one or more geographical locations.

The electronic devices 14 may be laptops, desktops, tablet computers, game consoles, personal data assistants (PDAs), smart phones, terminals or any other suitable electronic device that can access the network 16 to connect to the server 12.

The server 12 may include one or more computer processors that are configured to provide geolocation data management and presentation application whose features are described herein below.

Figure 2:
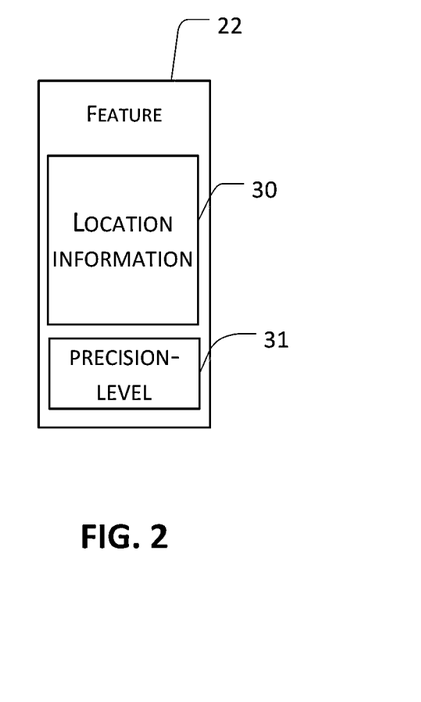
FIG. 2 is a schematic diagram of an exemplary feature with associated location information which may be represented on a map by the system shown in FIG. 1.

Referring now to FIG. 2, illustrated therein is an example feature 22. The feature 22 may be a feature of interest whose location can be expressed on a map. The feature 22 has location information 30 associated therewith. The location information is indicative of a geographic location of the feature 22. The location information, for example, may include geolocation data such as geocodes, street address, city, postal or zip codes, and so on. The location information 30 also has a precision-level 31 indicative of a precision of the geographic location. For example, the location information 30 may be precise to street-level, city-level, province/state-level, country-level and so on.

Figure 3:
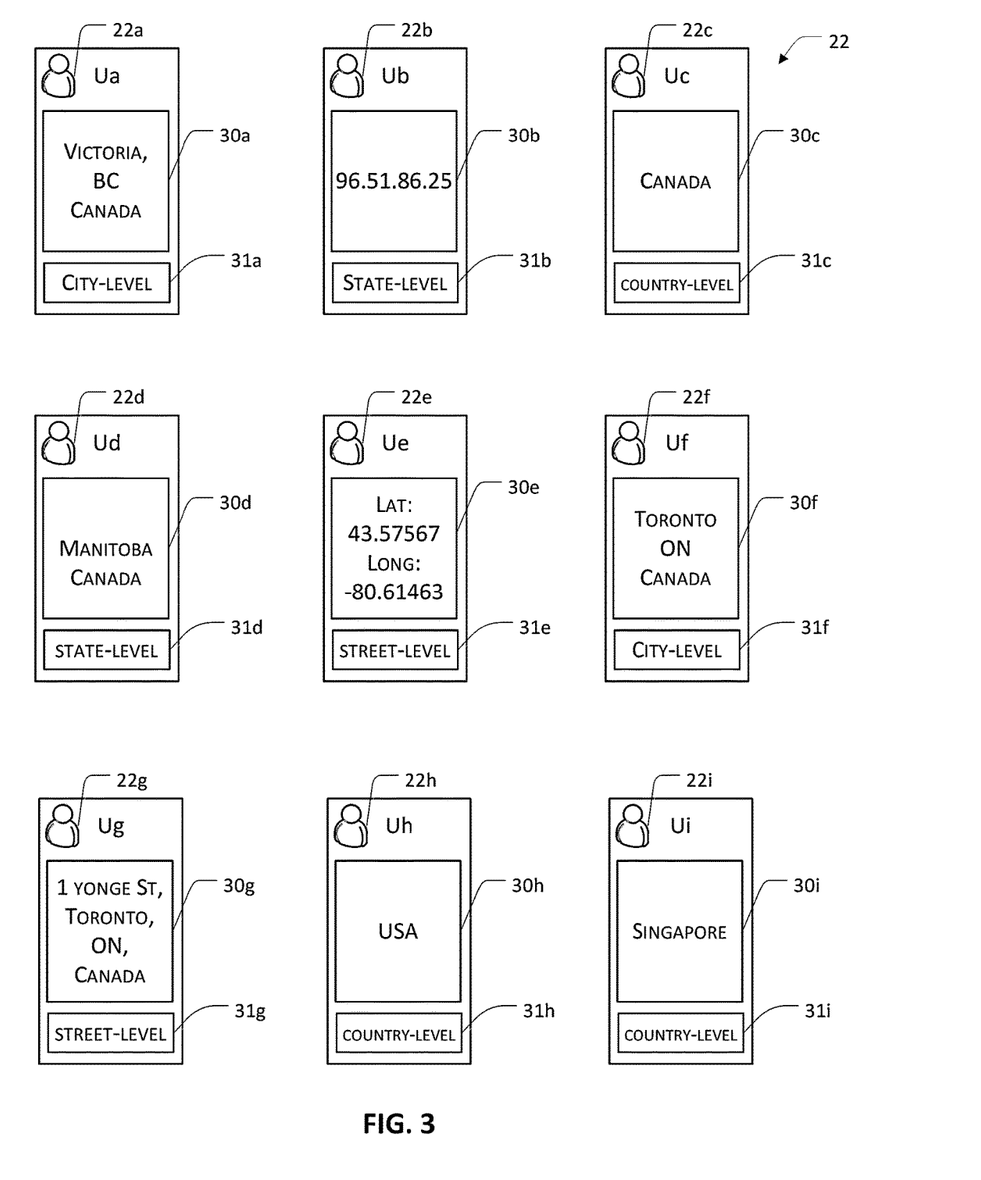
FIG. 3 is a schematic diagram of some exemplary users and their associated location information, which may be represented on a map by the system shown in FIG. 1.

Referring now to FIG. 3, illustrated therein are exemplary features 22. In the example as shown, the features 22 correspond to various users. The users may be one or more of the users 18 in the social network shown in FIG. 1.

Each user has location information (i.e. location data) associated therewith that is indicative of a geographic location of the user. The location information, for example, may be the location of the residence of the user or the current location of the user.

Each user also has a location precision-level indicative of the precision of the location information. In other embodiments, the location precision-level may be calculated from the information available upon demand and not predetermined and explicitly stated as shown. For example, if the location information about a location only includes a name for a country, the location could be said to have a country-level precision.

In some cases, the precision-level for a location may vary depending on who is requesting the information based upon a user's privacy/securing settings. For example, a user may have configured his privacy/security to disclose his/her location at different precision levels based upon who is requesting the location information. For example, if the requestor of the information is unknown to the user, only country-level precision location information may be released. In contrast, if a family member is requesting the location information, then more precise location information such as street-level location information may be released.

The server 12 may be configured to generate one or more maps displaying one or more users, for example, as a response to the request received from one or more of the electronic devices 14. Depending on the configuration of the servers and the electronic devices, the map may be generated by the server 12, and in some cases by the combination of the server 12 and one of the devices 14.

In the example as shown, the features 22 include a user Ua, indicated by reference numeral 22a. The user Ua has associated location information, generally indicated by reference numeral 30a, which is data indicative of the city of Victoria in British Columbia, Canada. This location can be said to have a city-level precision 31a.

The features 22 also include a user Ub, indicated by reference numeral 22b. The user Ub has associated location information, generally indicated by reference numeral 30b, which is data indicative of an internet protocol address associated with a server located in Alberta, Canada. This location can be said to have a state/province-level precision 31b.

The features 22 also include a user Uc, indicated by reference numeral 22c. The user Uc has associated location information, generally indicated by reference numeral 30c, which is the country of Canada. This location can be said to have a country-level precision 31c.

The features 22 also include a user Ud, indicated by reference numeral 22d. The user Ud has associated location information, generally indicated by reference numeral 30d, which is indicative of the province of Manitoba, Canada. This location can be said to have a province-level precision 31d.

The features 22 also include a user Ue, indicated by reference numeral 22e. The user Ue has associated location information, generally indicated by reference numeral 30e, which include GPS coordinates. Depending on the precision of the given GPS coordinates, the location identified by the GPS coordinates could be associated with a street address, a city, and so on. In the present example, the GPS coordinates are associated with a location in a rural area of the province of Ontario, Canada, which be said to have a street-level precision 31e.

The features 22 also include a user Uf, indicated by reference numeral 22f. The user Uf has associated location information, generally indicated by reference numeral 30f, which is indicative of the city of Toronto in the province of Ontario in Canada. This location can be said to have a city-level precision 31f.

The features 22 also include a user Ug, indicated by reference numeral 22g. The user Ug has associated location information, generally indicated by reference numeral 30g, which is an exact address in the city of Toronto in the province of Ontario in Canada. This location can be said to have a street-level precision 31g.

The features 22 also include a user Uh, indicated by reference numeral 22h. The user Uh has associated location information, generally indicated by reference numeral 30h, which is associated with the United States of America, and can be said to have a country-level precision 31h.

The features 22 also include a user Ui, indicated by reference numeral 22i. The user Ui has associated location information, generally indicated by reference numeral 24i, which is indicative of the city state of Singapore. The location information 30i might be said to have a city-level precision or a country-level precision 31i as Singapore is a city-state.

Figure 4:
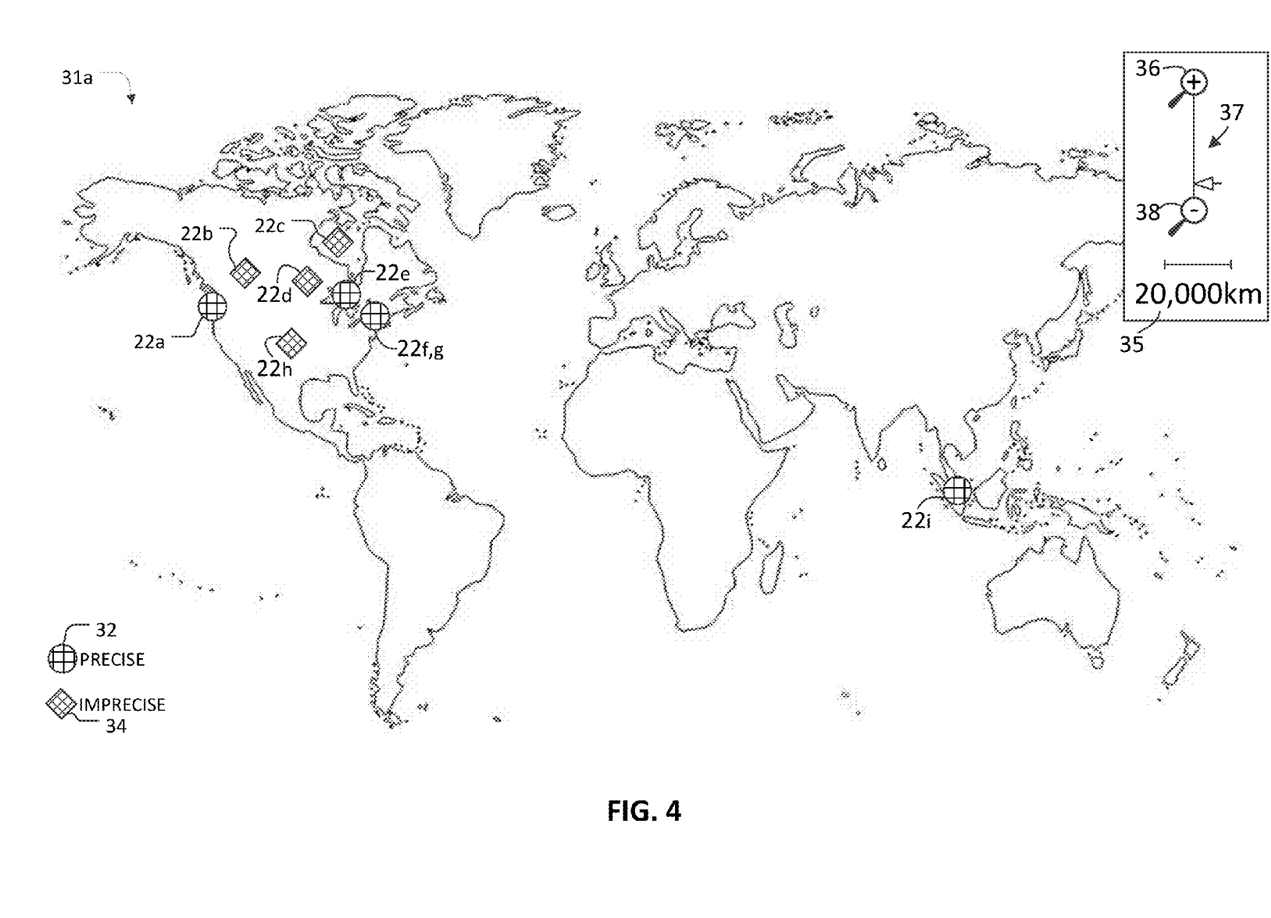
FIG. 4 is a first map generated by the system shown in FIG. 1, illustrating the location of the features shown in FIG. 3.
Figure 5:
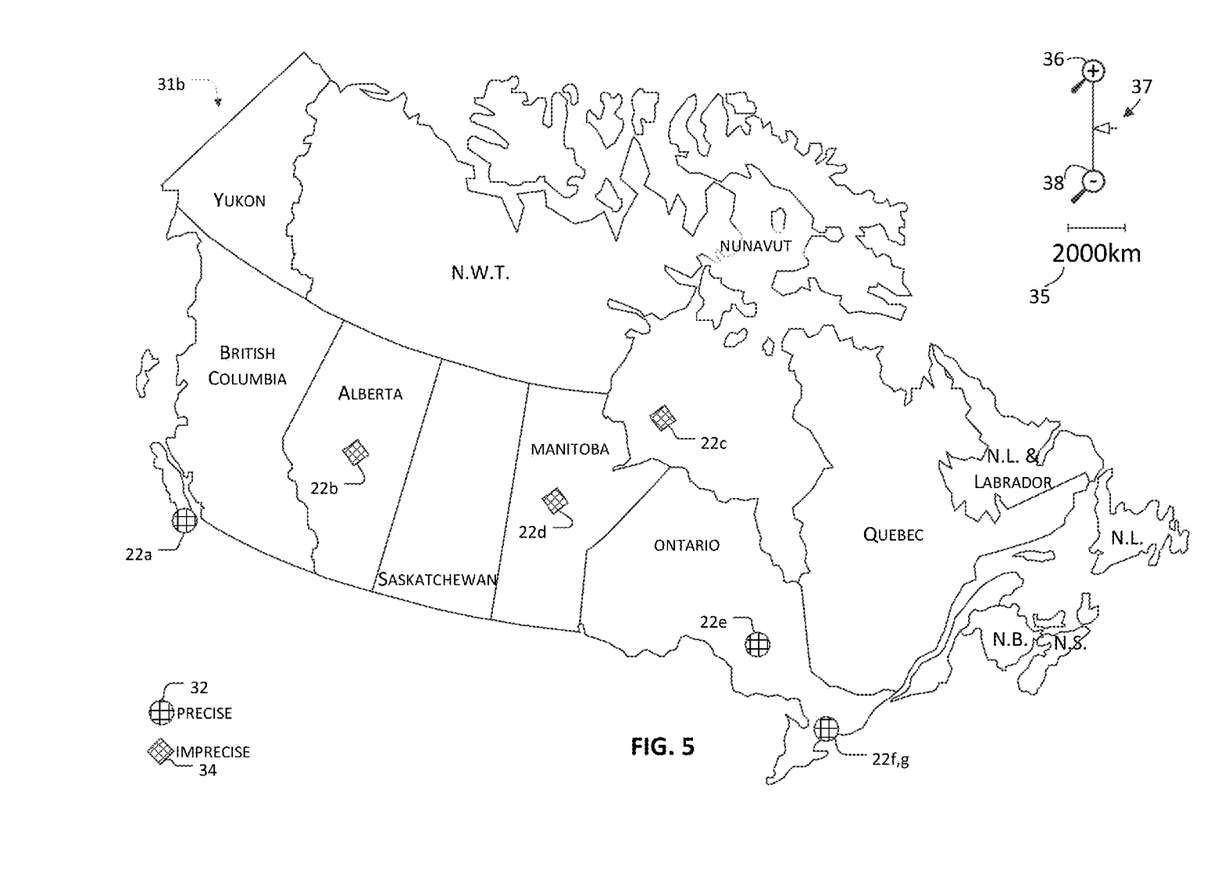
FIG. 5 is a second map generated by the system shown in FIG. 1, illustrating some of the locations of the features shown in FIG. 3.

Referring now to FIGS. 4 and 5, illustrated therein are maps 31a and 31b that may be generated by the server 12 and/or electronic devices 14 displaying features 22 according to some embodiments. The zoom-level and the scale of map 31a is selected such that the entire world is visible. In contrast, map 31b has a higher zoom level (i.e. is more zoomed in) such that the scale of the map is lower and only a fraction of the world is visible. In the example as shown, the visible area of the map 31b is focused on various provinces in Canada.

Each of the maps 31a and 31b include a scale 35, which provides an approximate scale of the map. The maps 31a and 31b also include a display 37 indicative of the current zoom level, a first control button 36 for "zooming in" (increasing the zoom) on the map and a second control button 38 for "zooming out" (decreasing the zoom) of the map.

Various locations 30 are displayed on the map 31 using either a precise location icon 32 (precise icon 32) or an imprecise location icon 34 (imprecise icon 34).

The precise location icon 32 indicates that a location associated with a point of interest that is being displayed using the icon 32 is precise. That is, the position of the icon 32 on the map represents the actual precise location of the point of interest relative to the scale of the map.

In contrast, the imprecise location icon 34 indicates that a location associated with a point of interest that is being displayed using the icon 34 is imprecise. That is, the position of the icon 34 on the map does not represent the exact location of the point of interest on the map.

Using two different types of icons to represent precise and imprecise locations on the map may allow a user to understand the precision of the location information being displayed on the map readily. This can be contrasted from systems where both precise and imprecise locations are displayed using a same icon.

The system 10 also uses icons that are generally similar in size. In other words, both the precise icon 32 and the imprecise icon 34 have a constant size that does not change relative to the precision of the location that is being represented. This can be contrasted from systems that use differently sized icons to represent locations with varying precision. For example, the precise and imprecise icons used in the system 10 differ from "imprecision circles" and/or any other icons that change in size to indicate the precision of the location data.

In the embodiment as shown, the precise icon 32 and imprecise icon 34 are generally the same size. In other embodiments, the precise icon 32 and imprecise icon 34 may be exactly the same size or be generally similar in size. The sizes of the precise icon 32 and imprecise icon 34 are not affected to the precision level of the location data.

As shown, the icons 32 and 34 are distinguished based upon the shape of the icons 32 and 34. In other embodiments, the precise and imprecise icons 32 and 34 may be distinguishable from each other in one or more aspect other than the colour, size and/or shape of the icon.

Referring back to FIG. 4, the users 22a-22i are plotted on the map 31 using either a precise location icon 32 or an imprecise location icon 34. The location of the icons 32 or 34 for each of the users 22a-22i are determined based upon the corresponding location information 30a-30i. The determination as to whether to use a precise location icon 32 or an imprecise icon 34 is described in further detail herein below.

The locations of users Ua, Ue, Uf, Ug, and Ui are plotted using precise location icons 32, while the locations Ub, Uc, Ud and Uh are plotted using imprecise location icons 34.

The locations of the users that are plotted using precise icons 32a-32d indicate that the position of these icons precisely reflect the actual locations on the map 31. As shown, the location 24a for the city of Victoria is plotted using a precise location icon 32. The location 24e for user Ue, which comprises GPS coordinates, is also plotted using a precise location icon 32.

The locations 24f and 24g for users Uf and Ug, indicative of the city of Toronto and an exact address in Toronto respectively, are clustered together and plotted using a single precise location icon 32.

Clustering of some locations (i.e. a number of locations being represented by a single icon) may help reduce the clutter on a displayed map. In some embodiments, an icon that is representing a cluster of locations may be different from an icon that represents a single location. In some embodiments, the icon representing a cluster of locations may include one or more indicia indicative of the number of locations that it is representing.

In some embodiments, when a user interacts with the icon representing a cluster of locations, (e.g. mouse-over, click, etc.), a list including the locations that are being represented by that icon may be displayed. In some cases, a cluster icon may represent both a location that is precise and a location that is imprecise. In such cases, a precise location icon may be used to represent both precise and imprecise locations if at least one of the locations in the cluster is precise.

The location 24i for the user Ui, which is associated with the city of Singapore, is plotted using a precise icon 32. As Singapore is a city-state, it could be viewed as having city-level precision or country-level precision.

In contrast to locations for the users Ua, Ue, Uf, Ug and Ui, the locations for the users Ub, Uc, Ud and Uh are plotted using the imprecise location icons 34. Imprecise icons are used to indicate that these positions on the map are not intended to represent precise locations of the users, but rather they represent imprecise approximations of their locations.

As shown, the location for user Ub is associated with the province of Alberta and plotted using an imprecise location icon 34, placed approximately in the centre of the province of Alberta. Similarly, the location for user Ud associated with the province of Manitoba is plotted using an imprecise location icon 34, placed approximately in the centre of the province of Manitoba. The location for user Uc, which is associated with Canada, is plotted using an imprecise location icon 34 placed approximately in the centre of the country of Canada.

For each location, a determination as to whether to use a precise icon 32 or an imprecise icon 34 is made. In some embodiments, this determination may be made after a map displaying the locations is requested. In some embodiments, whether to use a precise icon 32 or an imprecise icon 34 may be predetermined.

In some embodiments, the server 12 may be configured to determine whether to use a precise icon 32 or an imprecise icon 34 to represent a feature. In some embodiments, one or more of the electronic devices may be configured to determine whether to use the precise icon 32 or the imprecise icon 34. In some embodiments, a combination of the server 12 and the devices 14 may be configured determine whether to use the precise icon 32 or the imprecise icon 34.

Whether to use a precise icon 32 or an imprecise icon 34 to represent a location may be determined by comparing the size of the icon to the area of the location in a particular map of a particular scale/zoom-level. For example, if the on-screen area of the icon (i.e. the area of the screen covered by the icon) is larger than the on-screen area of the location, then a precise location icon may be used. Alternatively, if the on-screen area of the icon is less than the on-screen area of the location, then an imprecise location icon may be used.

The on-screen area for each of the icons may be determined using various methods. For example, the on-screen area of an icon may be predetermined.

The on-screen area for each location may be determined using various methods. In some cases, it may be possible to obtain actual area (not on-screen) information for a given location. In some cases actual area information for a location may be obtained from geocode data provided by various geocode databases.

For example, the server 12 may be configured to interface with a third-party geocoding service to retrieve geocoding data corresponding to a text-based location data. For example, the server 12 may interface with geocoding services provided by Google Inc. or Microsoft Inc. to obtain geocode data for each location shown in FIG. 3. The server may provide the available textual location information (e.g. country of Canada, province of Ontario, city of Toronto, or exact address) to obtain corresponding geocode data.

Geocode data may include mapping information for the location such as latitude and longitude coordinates. In addition to geographical coordinates, geocode data may also include "bounding box" information indicative of the area of the location, information on whether the location is an urban area or a rural area, and so on.

In the cases where the actual area of the location is provided in the corresponding geocode data, the corresponding on-screen area for the location may be determined for a particular map display. The on-screen area of the location can then be compared with the on-screen area of the icons to determine whether a precise or imprecise icon should be used.

In some embodiments, text-based location data may be converted to corresponding geocoding data upon demand. For example, the geocoding data corresponding to a location may be obtained when a map including the location is requested. In some embodiments, the text-based location data may be pre-converted to corresponding geocoding data. For example, when an address or other text-based location information is received, corresponding geocoding data may be retrieved and stored. In some embodiments, a combination of conversion upon demand and pre-conversion to geocode data may be used.

In some cases, geocoding data may not include information indicative of an area of a location, or use of such information may not be preferred. In such cases, the area of the location may need to be determined using other means.

In some embodiments, the server 12 may be configured to use a look-up table that has information indicative of whether to use a precise icon or imprecise icon for each location based upon the zoom-level/scale of the map.

Figure 6:
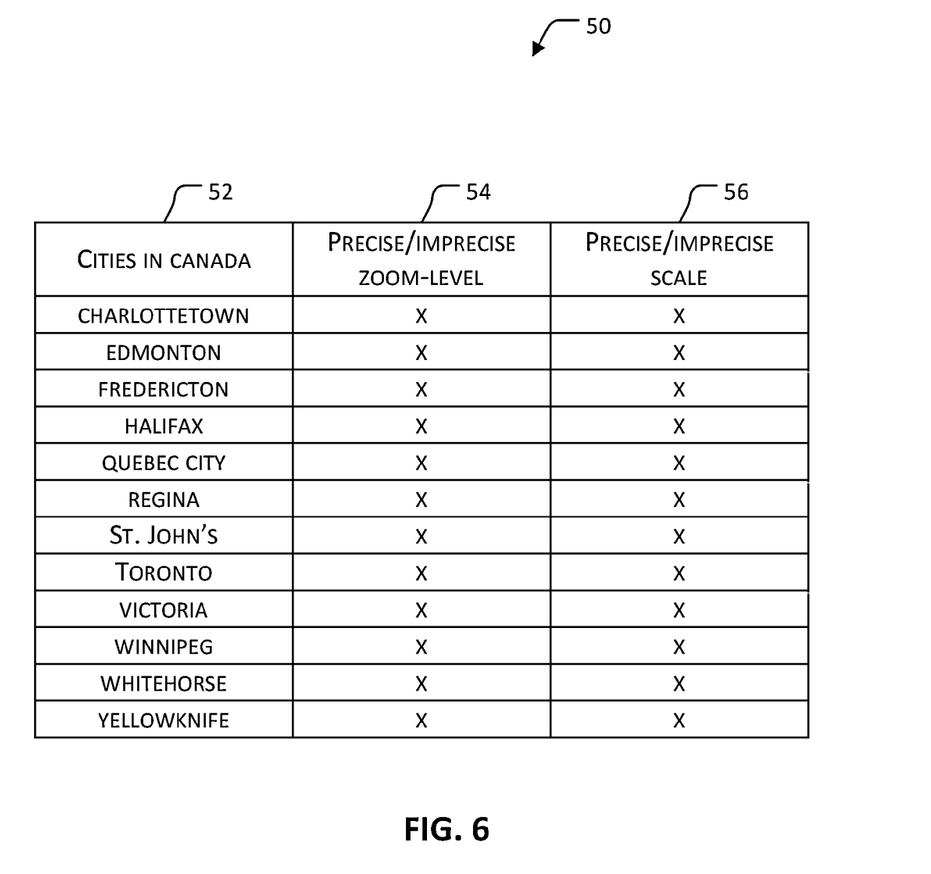
FIG. 6 is an exemplary look-up table that may be used to generate maps shown in FIGS. 3 and 4.

Referring now to FIG. 6, illustrated therein is an exemplary look-up table 50, which could be used to determine whether a precise icon or an imprecise icon may be used to represent a location on a map of a given zoom-level or scale.

The exemplary table 50 includes a list of capital cities 52 in Canada. Each of the cities has a predetermined precise/imprecise zoom-level indicated in column 54. The precise/imprecise zoom-levels are represented by the variable "x" in the illustrative example, however it should be understood that a numerical value or other data will be provided in practice. The values for precise/imprecise zoom-level for each city, for example, may depend on the map being provided, the on-screen size of the city for various zoom-levels, and the on-screen size of the precise and imprecise icons. These values may be used in the determination of whether a precise icon or an imprecise icon is used to represent a location. For example, if the zoom-level of the current map to be displayed is larger than or equal the value provided in column 54, a precise icon may be used to represent that location. If the zoom-level of the current map to be displayed is smaller than the value provided, an imprecise icon may be used for the corresponding location. The table 50 also includes a column 56 with various scales of a given map for each location. The scale of the map is similar to the zoom-level in that it illustrates a point where an imprecise or a precise icon is used to represent a location. However, unlike the zoom-level which may differ between various mapping services being used, the scale of the map may be more universally applicable.

In some embodiments, whether to use a precise or an imprecise icon could be determined based upon a set of rules. For example, there may be a rule that states that any street-level precise location is represented using a precise icon, regardless of the scale of the map. In another example, there may be a rule that defines a default zoom level above which a precise icon is used for locations within a given precision level (e.g. city-level precision). In some cases, there may be a rule that defines a default zoom level above which a precise icon is used for city-level precise locations where information on the size of the city is not available.

In addition to displaying locations using the precise and the imprecise icons, the system 10, in some embodiments, may also be configured to determine an appropriate scale or a zoom level to display a requested map.

Selecting an appropriate scale of the map to display may improve the recognisability of the map to a user viewing the map. For example, if the displayed map is zoomed in on a particular neighbourhood in a city, the displayed map may not be recognizable to a user who is not familiar with the neighbourhood. However, if the displayed map is zoomed out such that it shows an entire city or the surrounding region, the displayed map may become recognizable to the user.

In some embodiments, the server 12 may be configured to determine an appropriate scale of the map to display to a user based upon information from the user's profile. For example, the scale of the map may be selected based upon the user's address such that both their address and the other locations of interest are displayed on the map. For example, if the user's address is in Toronto, Canada and a location of interest is Singapore, which is a country located in Asia, the selected scale of the map may be selected such that both the user's location (i.e. Toronto) and Singapore are viewable on the same map (e.g. the map shown in FIG. 4).

In some cases, even though the scale of the map is selected such that the location of the user and the location of the feature of interest may be viewable on the same map, the position of the viewable window for the map may not necessarily show both the user location and the location of interest at the same time. That is, the viewable area of the map may be selected such that both the user location and the location of interest are not visible simultaneously. That is, it is not strictly necessary to show the user's location on the map to improve recognisability for the user. For example, the viewable area of the map may focus on the location of the feature of interest.

In some embodiments, the server 12 may be configured to determine an appropriate scale of the map to display to a user based upon precision of one or more locations to be displayed. For example, if a location to be displayed has a state-level precision it may be desirable to show a less zoomed-in map, while in contrast for a location with street-level precision a more zoomed-in map may be desirable. For example, the server 12 may be configured not to display a map that is zoomed-in to show street level details when the location to be displayed has a city-level precision.

In some embodiments, the server 12 may be configured to determine an appropriate scale of the map to display to a user based upon information that is provided by a mapping tool at various zoom levels. That is, mapping tools provide different information at different zoom levels. For example, when the zoom level is within a certain range, the displayed map may include names of certain cities, states, countries and so on. Similarly, labels for some roads and highways may only be displayed in certain zoom-levels. Furthermore, various mapping tool providers (e.g. Google Inc., Microsoft Inc.) may have different settings for the information that are provided on the map. In such cases, the system 12 is configured to account for difference in information provided by different mapping tools. By selecting zoom levels that include easily readable labels for one or more of the locations of interest, recognisability may be improved for the user.

The server 12 may be configured to determine an appropriate scale of the map to be displayed based upon the level of detail provided by various mapping tools at a given zoom level. For example, if the location to be displayed has country-level precision, the scale of the displayed may be selected such that the name of the country is provided by the mapping tool, and/or such that the country is visually well represented. It should be understood that selecting a single zoom-level for all countries may not be appropriate since different countries may differ vastly in size. For example, a preferred zoom-level to display Canada on a map would be different than a preferred zoom-level to display Singapore due to the difference in size between the two countries.

Figure 7:
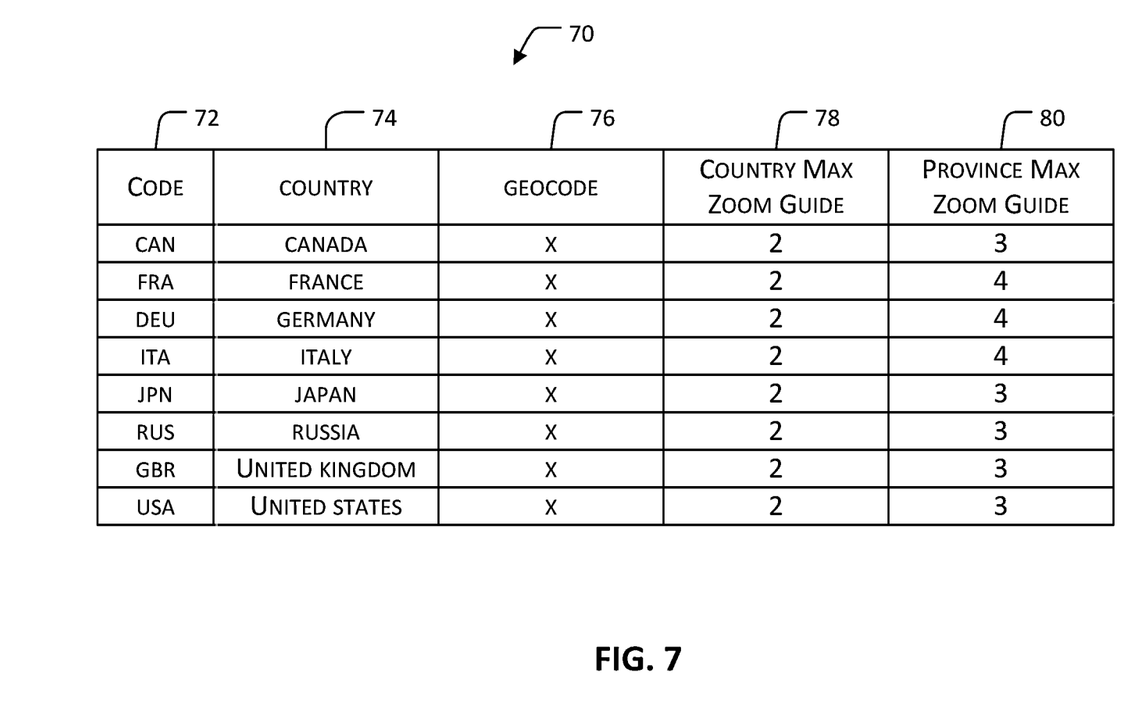
FIG. 7 is an exemplary look-up table that may be used to select appropriate zoom-level for displaying the map shown in FIGS. 3 and 4.

In some cases, the server 12 may be configured to use a look-up table to determine an appropriate zoom-level for a given location. Referring now to FIG. 7, illustrated therein is a Table 70 illustrating some exemplary countries and corresponding zoom-levels at which the countries should be displayed. In other cases, there may be other country-level, state-level, or city-level look-up tables that provide appropriate zoom-levels for different locations. In some embodiments, there may be multiple sets of look-up tables corresponding to multiple map sources.

The exemplary Table 70 includes column 74 listing a plurality of countries (in this case G8 countries) in alphabetical order. The Table 70 also includes a column 72 storing the country code for each country and a column 76 storing the geocode for each country. The geocode information may differ depending on which mapping service is used. For example, the geocode information may be the name of the country or the geographical coordinates associated with the country.

The Table 70 also includes a column 78 holding values for the country max zoom guide. The value in this column is indicative of a preferred maximum zoom-level that can be selected to ensure the country is well represented in the map display. This guideline may be based upon visibility of the country itself; visibility of map features such as country name, or state/provincial boundaries; general map aesthetics; and/or other factors. Similarly, the Table 70 also includes a column 80 holding values for the province max zoom guide. The value in this column is indicative of a preferred maximum zoom-level that can be selected to ensure a state/province is well represented in the map display. This guideline may be based upon visibility of the state/province itself; visibility of map features such as country name, or state/provincial boundaries; general map aesthetics; and/or other factors.

In some cases, the table 70 may include centring information that is indicative of where to centre the map to effectively display a given location. For example, the centring information may be the longitude and latitude coordinates that are representative of the geographic centre of a city or the coordinates that shows the business district, downtown core, or the city hall of a given city.

Figure 8:
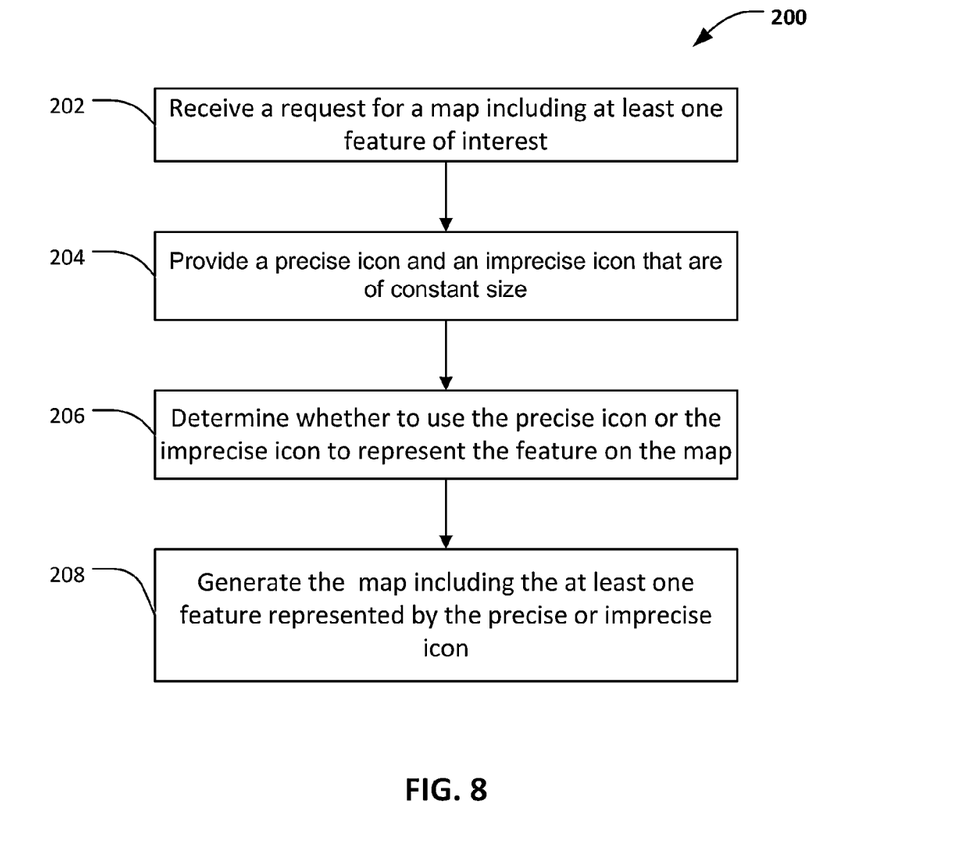
FIG. 8 is a schematic diagram illustrating a method for managing and presenting geographical data according to other embodiments.

Referring now to FIG. 8, illustrated therein is a method 200 for managing and displaying location data according to some embodiments. The method 200 may be executed by one or more processors in the system 10 described herein above.

The method begins at step 202, wherein at least one request from one of at least one electronic device for at least one map including at least one feature of interest is received. The at least one feature has location information associated therewith that is indicative of a geographic location of the feature. The location information includes information that is indicative of the precision of the geographic location. The step 202, for example may be reached when a user requests a map, when a user zooms in on a previously presented map, or a when a user zooms out from a previously presented map. Generally, zooming in or out of a map may be treated as a request for a new map with a different scale.

At step 204, a precise icon and an imprecise icon are provided. The icons are used to represent the at least one feature on the at least one map. The precise icon and the imprecise icon have a constant size regardless of the precision of the location.

At step 206, whether to use the precise icon or the imprecise icon to represent the at least one feature on the at least one map is determined based upon a scale of the at least one map and the precision of the location information associated with the at least one feature.

At step 208, the at least one map including the at least one feature being represented by the precise icon or the imprecise icon is generated.

It should be understood that the method 200 described herein above is only for exemplary purposes. In various embodiments, one or more of the steps of the method may be omitted, performed in different order, and/or one or more other steps may be included in the method.

While the above description provides examples of one or more apparatus, methods, or systems, it will be appreciated that other apparatus, methods, or systems may be within the scope of the present description as interpreted by one of skill in the art. Moreover, the scope of the claims appended hereto should not be limited by the embodiments set forth in the examples, but should be given the broadest interpretation consistent with the description as a whole.

The invention claimed is:

1. A system for managing and presenting geolocation data, the system comprising:
    a server in data communication with an electronic device, the server having at least one processor, the processor being configured for:
        (a) receiving a request from the electronic device for a map including at least one feature of interest, the at least one feature having location information associated therewith, the location information being indicative of a geographic location and an area of the at least one feature on the map, the location information having precision information associated therewith, the precision information being indicative of a level of precision of the location information;
        (b) providing a precise icon or an imprecise icon for representing the at least one feature on the map, the precise icon indicating that the area of the at least one feature is not larger than a size of the precise icon, the imprecise icon indicating that the area of the at least one feature is larger than a size of the imprecise icon;
        (c) determining whether to use the precise icon or the imprecise icon to represent the at least one feature on the map based upon information indicative of a scale of the map and the precision information associated with the at least one feature; and (d) generating the map including the at least one feature being represented by the precise icon or the imprecise icon, the map being presentable on a display of the electronic device;

(e) wherein the location information, the size of the precise icon, the size of the imprecise icon, and the scale of the map are each provided by at least one of the server and the electronic device.

2. The system of claim 1, wherein the determining whether to use the precise icon or the imprecise icon comprises at least one of:

(a) determining whether the scale of the map exceeds a pre-determined threshold; and (b) comparing the size of the precise icon or the imprecise icon to the area of the at least one feature on the map.

3. The system of claim 2, wherein the pre-determined threshold is based upon at least one of the precision information and the location information associated with the at least one feature.

4. The system of claim 1, wherein the at least one feature being represented on the map by the precise icon or the imprecise icon comprises placing the precise icon or the imprecise icon at a center of the geographic location of the at least one feature on the map.

5. The system of claim 1, wherein the size of the precise icon or imprecise icon remains constant regardless of the level of precision of the at least one feature to be represented by the precise or imprecise icon.

6. The system of claim 1, wherein:

(a) the at least one feature comprises a plurality of features; and (b) the generating the map comprises generating the map including the plurality of features being represented by at least one precise icon and at least one imprecise icon.

7. The system of claim 1, wherein the precision information comprises at least one of country level, province/state level, city/town level, postal/zip code level, and street level.

8. The system of claim 1, wherein the precise icon and the imprecise icon are similar in size.

9. The system of claim 1, wherein the precise icon and the imprecise icon are differentiated by shape.

10. The system of claim 1, wherein the precise icon and the imprecise icon are not differentiated by at least one of color and fill pattern.

11. A method for managing and presenting geolocation data, the method being implemented by a server in data communication with an electronic device, the method comprising:

(a) receiving a request from the electronic device for a map including at least one feature of interest, the at least one feature having location information associated therewith, the location information being indicative of a geographic location and an area of the at least one feature on the map, the location information having precision information associated therewith, the precision information being indicative of a level of precision of the location information;

(b) providing a precise icon or an imprecise icon for representing the at least one feature on the map, the precise icon indicating that the area of the at least one feature is not larger than a size of the precise icon, the imprecise icon indicating that the area of the at least one feature is larger than a size of the imprecise icon;

(c) determining whether to use the precise icon or the imprecise icon to represent the at least one feature on the map based upon information indicative of a scale of the map and the precision information associated with the at least one feature; and (d) generating the map including the at least one feature being represented by the precise icon or the imprecise icon, the map being presentable on a display of the electronic device;

(e) wherein the location information, the size of the precise icon, the size of the imprecise icon, and the scale of the map are each provided by at least one of the server and the electronic device.

12. The method of claim 11, wherein the determining whether to use the precise icon or the imprecise icon comprises at least one of:

(a) determining whether the scale of the map exceeds a pre-determined threshold; and (b) comparing the size of the precise icon or the imprecise icon to the area of the at least one feature on the map.

13. The method of claim 12, wherein the pre-determined threshold is based upon at least one of the precision information and the location information associated with the at least one feature.

14. The method of claim 11, wherein the at least one feature being represented on the map by the precise icon or the imprecise icon comprises placing the precise icon or the imprecise icon at a center of the geographic location of the at least one feature on the map.

15. The method of claim 11, wherein the size of the precise icon or imprecise icon remains constant regardless of the level of precision of the at least one feature to be represented by the precise or imprecise icon.

16. The method of claim 11, wherein:

(a) the at least one feature comprises a plurality of features; and (b) the generating the map comprises generating the map including the plurality of features being represented by at least one precise icon and at least one imprecise icon.

17. The method of claim 11, wherein the precision information comprises at least one of country level, province/state level, city/town level, postal/zip code level, and street level.

18. The method of claim 11, wherein the precise icon and the imprecise icon are similar in size.

19. The method of claim 11, wherein the precise icon and the imprecise icon are differentiated by shape.

20. The method of claim 11, wherein the precise icon and the imprecise icon are not differentiated by at least one of color and fill pattern.

* * * * *